United States Patent
Huang et al.

(10) Patent No.: US 10,659,442 B1
(45) Date of Patent: May 19, 2020

(54) SECURITY IN SMART CONFIGURATION FOR WLAN BASED IOT DEVICE

(71) Applicant: Marvell International Ltd., Hamilton (BM)

(72) Inventors: Frank Huang, Dublin, CA (US); Timothy J. Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 205 days.

(21) Appl. No.: 15/378,276

(22) Filed: Dec. 14, 2016

Related U.S. Application Data (60) Provisional application No. 62/270,323, filed on Dec. 21, 2015.

(51) Int. Cl.
*H04L 29/06* (2006.01)
*H04W 12/06* (2009.01)
*H04W 12/08* (2009.01)

(52) U.S. Cl.
CPC ........ *H04L 63/062* (2013.01); *H04L 63/0428* (2013.01); *H04L 63/083* (2013.01); *H04L 63/10* (2013.01); *H04L 63/18* (2013.01); *H04W 12/06* (2013.01); *H04W 12/08* (2013.01)

(58) Field of Classification Search
CPC ....... H04L 63/062; H04L 63/18; H04L 63/10; H04L 63/083; H04L 63/0428; H04W 12/06; H04W 12/08
See application file for complete search history.

(56) References Cited

U.S. PATENT DOCUMENTS

| | | | | |
|---|---|---|---|---|
| 9,801,216 | B1* | 10/2017 | Williams | H04W 84/12 |
| 2014/0056171 | A1* | 2/2014 | Clegg | H04W 12/06 370/254 |
| 2015/0229475 | A1* | 8/2015 | Benoit | H04L 9/14 713/168 |
| 2015/0245204 | A1* | 8/2015 | Heydon | H04L 43/065 713/171 |
| 2015/0289295 | A1* | 10/2015 | Granbery | H04B 5/04 370/230 |
| 2015/0327060 | A1* | 11/2015 | Gilson | H04W 76/10 726/7 |
| 2016/0021635 | A1* | 1/2016 | Lee | H04W 12/06 455/411 |

* cited by examiner

Primary Examiner — Nelson S. Giddins (57) ABSTRACT

Provided is a method in a device under configuration (DUC) for communicating with a remote device over a wireless local area network. The method comprises transmitting a beacon to a remote device, providing a first security key to the remote device using first security measures, authenticating the remote device using second security measures, receiving encrypted secrets from the remote device, and obtaining network access using the secrets. Also, provided is a method of providing network access information over a wireless network. The method comprises identifying a device under configuration (DUC) from information contained in a beacon transmitted by the DUC, retrieving a public KEY from the DUC, authenticating the DUC using first security measures, encrypting secrets, and transmitting encrypted commands to the DUC.

20 Claims, 10 Drawing Sheets

SECURITY IN SMART CONFIGURATION FOR WLAN BASED IOT DEVICE

CROSS-REFERENCE TO RELATED APPLICATION

This application claims priority to U.S. Provisional Application No. 62/270,323, filed Dec. 21, 2015 and titled "Security in Smart Configuration for WLAN based IOT Device," the entirety of which is incorporated herein by reference.

BACKGROUND

The technology described in this patent document relates generally to network provisioning and more specifically to a secure method of provisioning a device.

A smart device (referred to herein as a REMOTE), such as a phone or tablet, can be used to help configure an internet of things (IOT) device for access to a network. An IOT device under configuration is referred to herein as a DUC.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1:
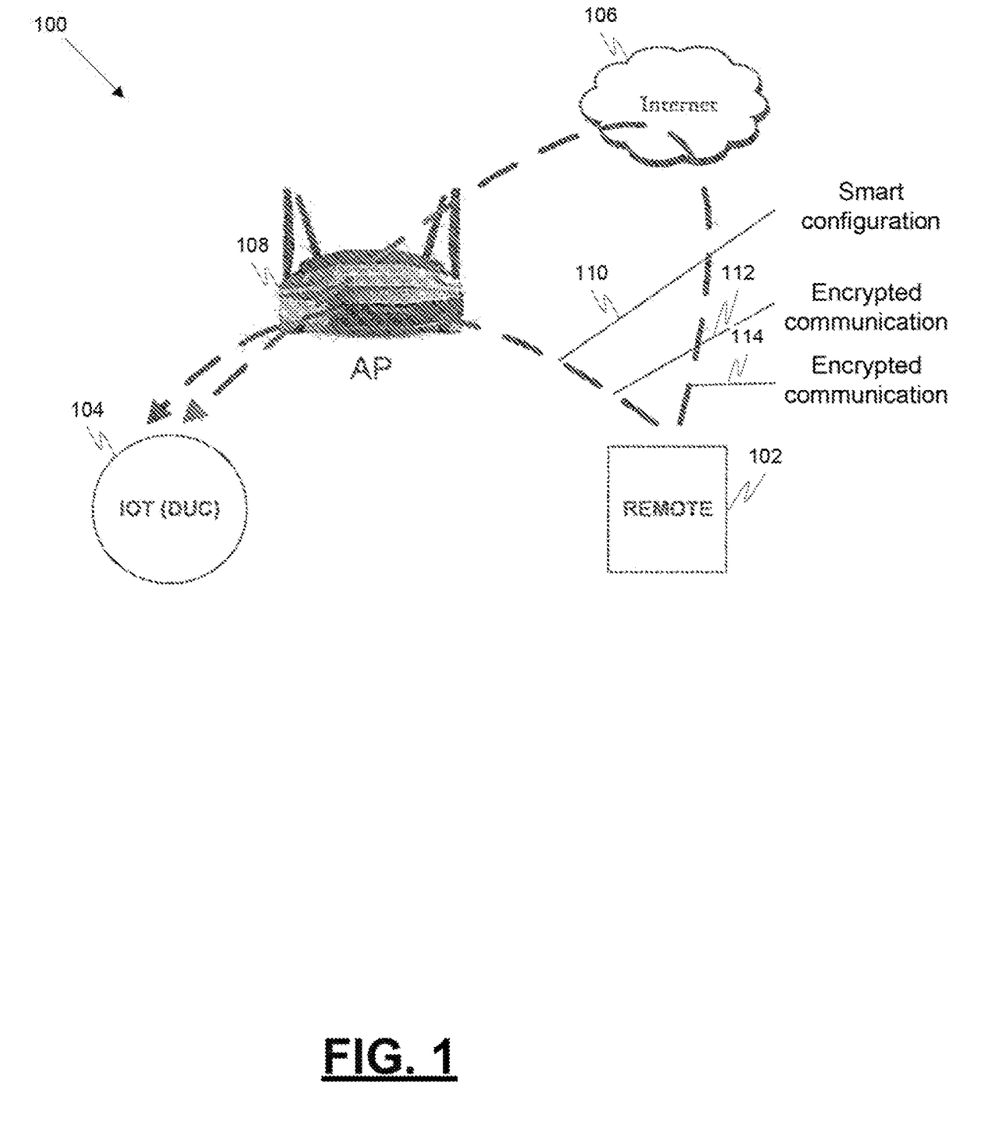
FIG. 1 is a block diagram of an example communication system, in accordance with some embodiments.

FIG. 1 is a block diagram of an example communication system 100 wherein a smart device (herein referred to as "REMOTE") 102, such as a phone or tablet, communicates with an internet of things (IOT) device 104 over a network such as a wireless local area network (WLAN) or the Internet 106. The example system 100 includes an access point (AP) 108 that provides intranet and internet access to the IOT device 104.

The example system 100 provides a smart configuration mode 110 over the WLAN for provisioning the IOT device 104. The smart configuration mode is used to configure the IOT device 104 and provides a method for an end user to directly deliver connection credentials (e.g., the service set identifier (SSID) and passphrase) for the AP 108 from the REMOTE 102 to the IOT DUC (device under configuration) 104. After configuration of the DUC 104, the REMOTE 102 may communicate with the DUC 104 using encrypted communications 112, 114, respectively, over the WLAN or the Internet.

The smart configuration mode 110 in the example system provides a level of security during connection credential delivery to reduce the likelihood of eavesdropping, tampering or message forgery. The smart configuration mode 110 accomplishes this by providing a secure method for authentication and encryption during smart configuration.

Figure 2:
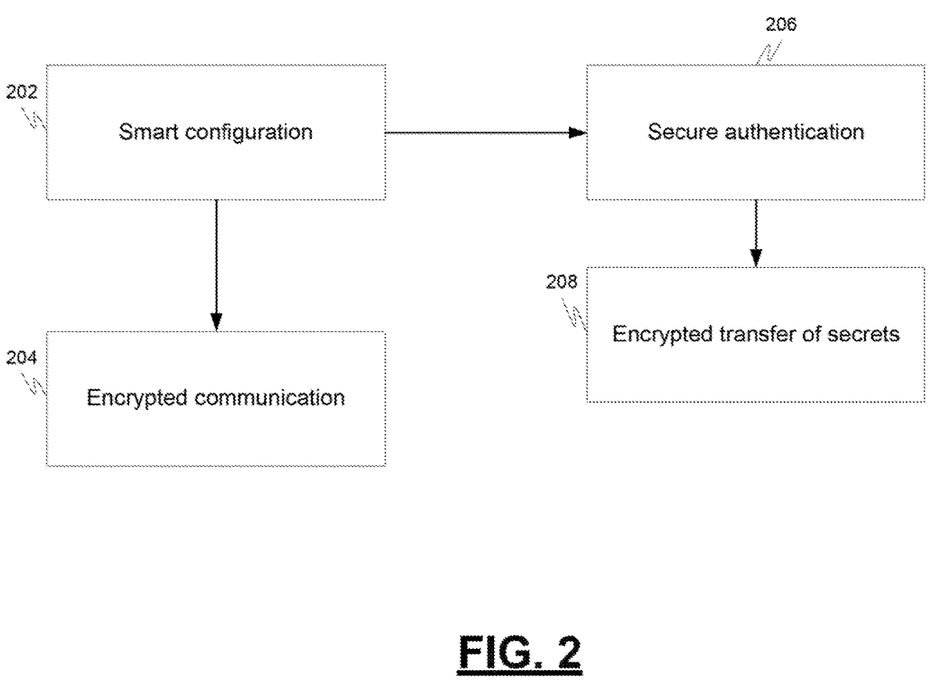
FIG. 2 is a process flow chart illustrating an example method of communication between a DUC and a REMOTE, in accordance with some embodiments.

FIG. 2 is a process flow chart illustrating an example method of secure communication between a DUC and a REMOTE. In this example, communication involves a smart configuration operation 202, wherein security operations are applied to configure a DUC using connection credentials delivered from a REMOTE to a DUC, followed by encrypted communication 204 between the REMOTE and the DUC. The smart authentication operations 202 include secure authentication operations 206 between the REMOTE and the DUC and the encrypted transfer of secrets, e.g., the connection credentials, from the REMOTE to the DUC.

Figure 3:
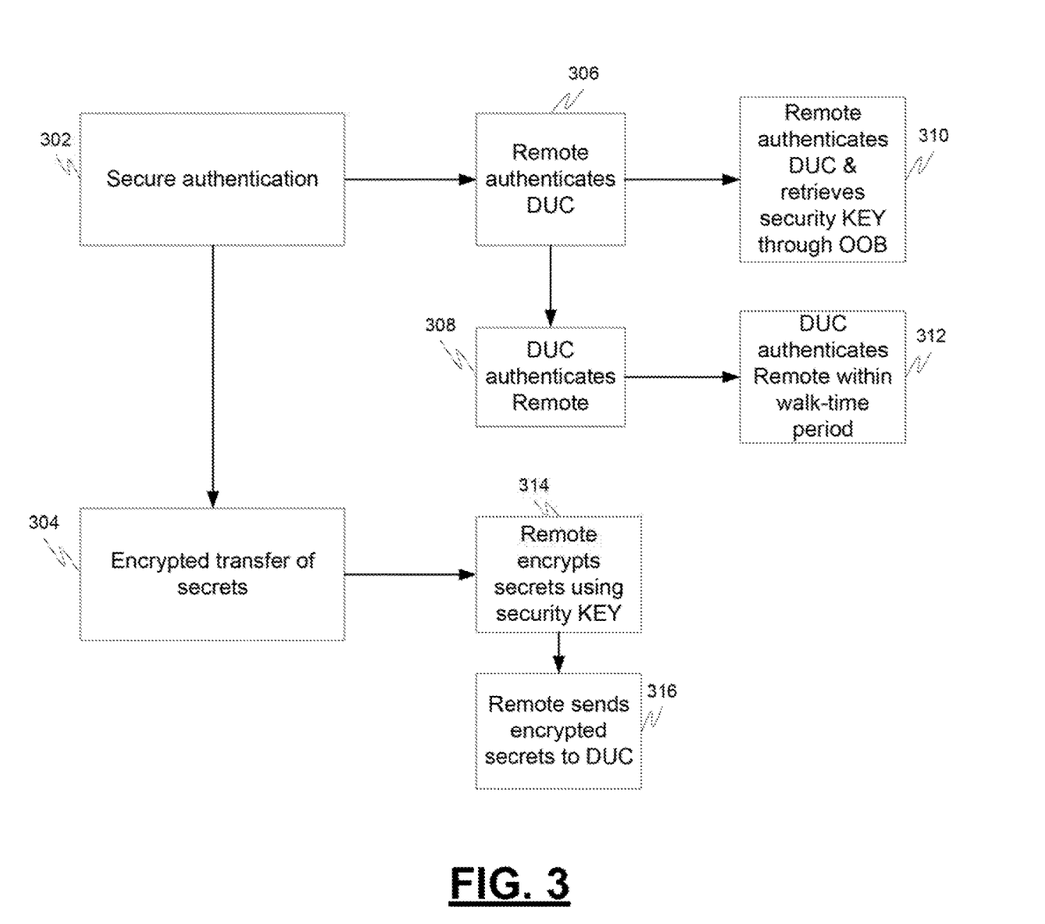
FIG. 3 is a process flow chart illustrating an example method of smart configuration of a DUC using a REMOTE, in accordance with some embodiments.

FIG. 3 is a process flow chart illustrating an example method of smart configuration of a DUC using a REMOTE. In this example, smart configuration includes secure authentication operations 302 between the REMOTE and the DUC followed by the encrypted transfer of secrets 304 from the REMOTE to the DUC.

The secure authentication operations 302 includes remote authentication operations 306, wherein the REMOTE authenticates the DUC, and DUC authentication operations 308, wherein the DUC authenticates the REMOTE. The remote authentication operations 306 involve the REMOTE authenticating the DUC and retrieving a security KEY (operation 310) through out of band (OOB) communication operations, e.g., a user reading a display or viewing LED lights on the DUC. The security system used in this example is a Rivest, Shamir, and Adleman (RSA) based public key scheme (e.g., RSA512 or RSA1024) that is used to secure the delivery of secrets including a passphrase for an AP, an AES key or other keys. The DUC authentication operations 308 involve the DUC authenticating the REMOTE (operation 312) within a predetermined time period (also known as walk-time period), e.g., two minutes. After the DUC and the REMOTE are authenticated to each other, provisioning may take place.

The encrypted transfer of secrets (operation 304) from the REMOTE to the DUC involves the encryption of secrets by the REMOTE using a security KEY (operation 314) and the transmission of the encrypted secrets from the REMOTE to the DUC (operation 316). In this example, a public key is used to encrypt secrets before delivery from the REMOTE to the DUC. The secrets may include an SSID (for example when the SSID of the AP is hidden), a passphrase, an AES key or other keys that could be used for communication between the DUC and the AP/REMOTE. The AES key is generated by the REMOTE, e.g., using an APP that is executing on the REMOTE. The AES key may be pre-generated or generated in real time during the configuration/provisioning session. The AES key may be used to encrypt the command and data exchanged between the REMOTE and DUC after successful configuration. After receiving the encrypted secrets, the DUC may use the secrets to establish network connectivity to allow further communication between the REMOTE and the DUC.

Figure 4:
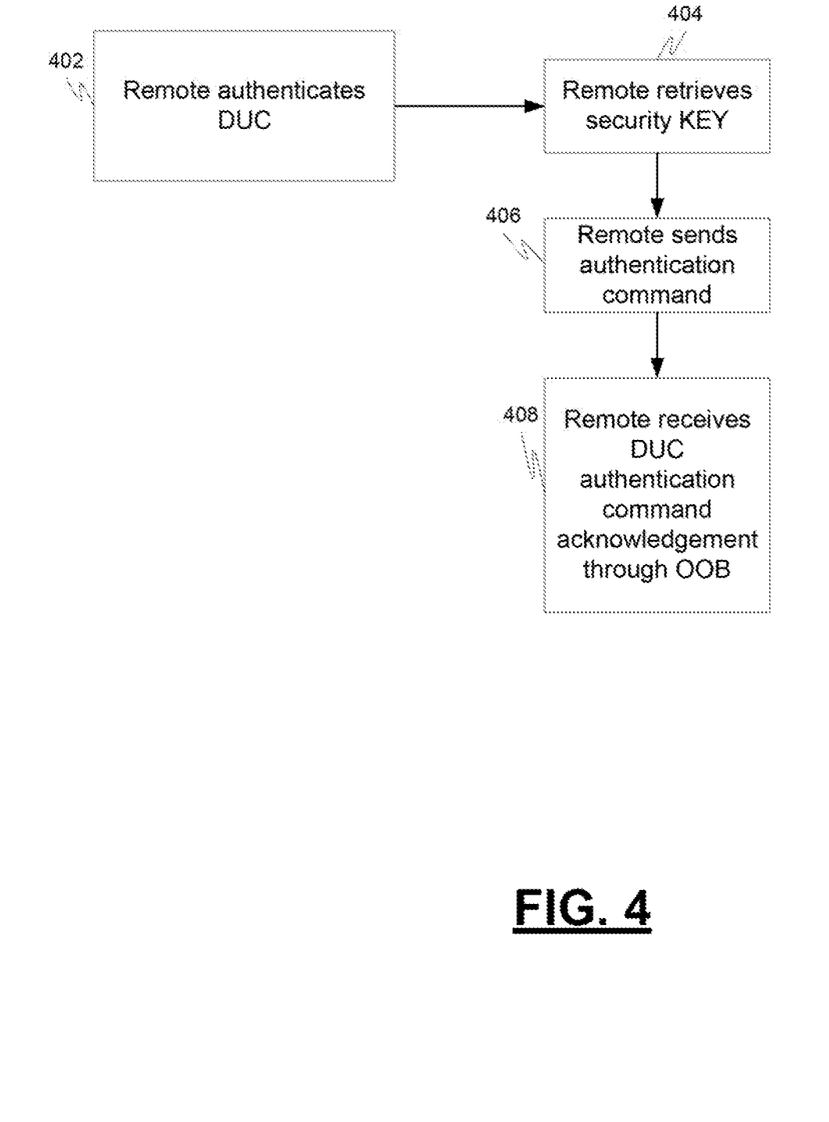
FIG. 4 is a process flow chart illustrating example operations for the REMOTE to authenticate the DUC, in accordance with some embodiments.

FIG. 4 is a process flow chart illustrating example operations for the REMOTE to authenticate the DUC. In this example, the REMOTE authenticating the DUC (operation 402) involves the REMOTE retrieving a security KEY (operation 404) such as a public key in an RSA public key scheme. After retrieving the security KEY, the REMOTE sends an authentication command to the DUC (operation 406). The REMOTE then waits for the receipt of a DUC authentication command acknowledgment (operation 408). The acknowledgment may come from an OOB communication method such as a specific LED blinking light pattern that is visually observable by a user or a message on a display of the DUC. The user can then enter an indication that the REMOTE has received the DUC authentication command acknowledgement.

Figure 5A:
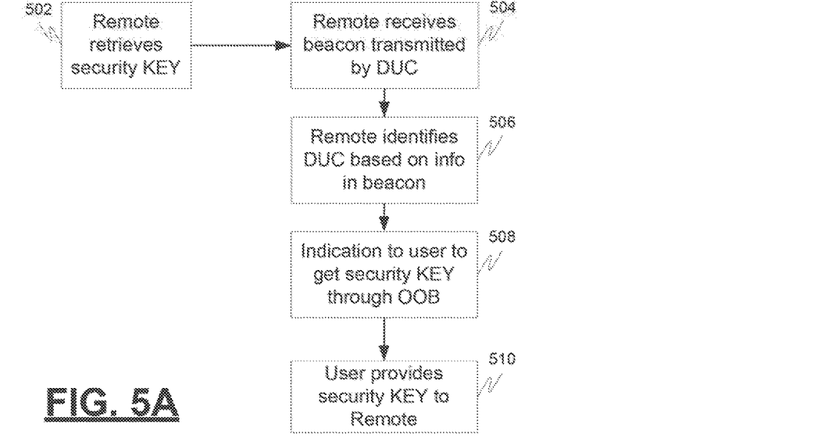
FIG. 5A is a process flow chart illustrating example operations for the REMOTE to retrieve a security KEY, in accordance with some embodiments.

FIG. 5A is a process flow chart illustrating example operations for the REMOTE to retrieve a security KEY. In this example, a private key and public key pair is pre-generated, for example, when the DUC is manufactured. A unique pair may be generated for each DUC. The private key that is unique to the DUC may be saved in EEPROM or OTP (one time programmable) memory on the DUC and maintained in secret. The public key may be printed on the device or written in a user manual accompanying the DUC.

The REMOTE retrieves the security KEY (operation 502) by receiving a beacon transmitted by the DUC (operation 504) after the DUC is powered on. The REMOTE identifies the DUC based on information contained in the beacon (operation 506). The REMOTE instructs the end user to retrieve the security KEY (operation 508) associated with the DUC identified by the beacon. The user retrieves the security key, e.g., the public key, for example, from a label on the device or from a user manual and provides the security KEY to the REMOTE (operation 510).

Figure 5B:
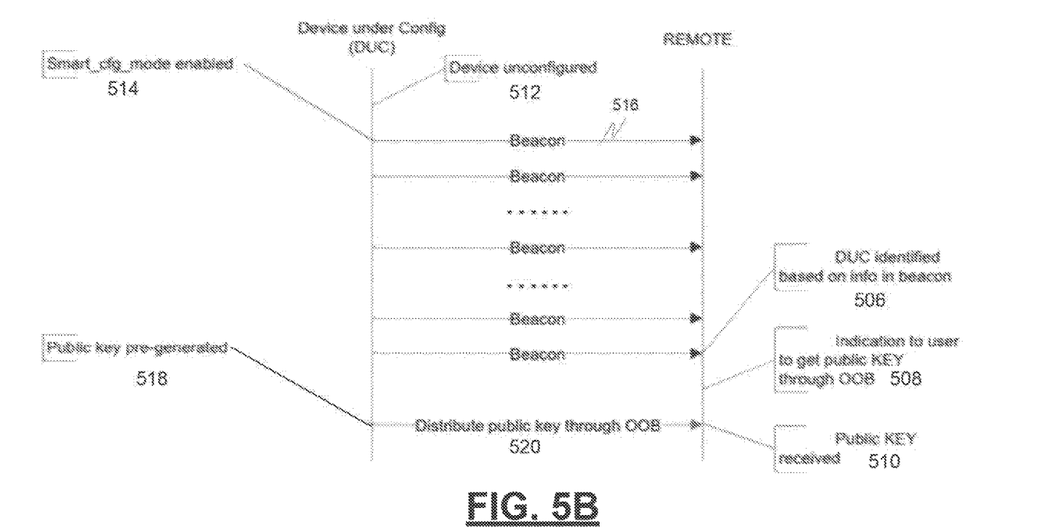
FIG. 5B is a state diagram illustrating example communications between the DUC and REMOTE during operations for the REMOTE to retrieve a security KEY, in accordance with some embodiments.

FIG. 5B is a state diagram illustrating example communications between the DUC and REMOTE during operations for the REMOTE to retrieve a security KEY. Initially, the DUC is in a non-configured (state 512). The DUC is powered on and a smart configuration mode is enabled (state 514). In this mode the DUC transmits one or more beacon(s) 516. The REMOTE receives a beacon and identifies the DUC based on information contained in the beacon (operation 506). The REMOTE instructs the end user to retrieve the security KEY (operation 508) associated with the DUC identified by the beacon. The user retrieves the security key (e.g., the public key), for example, from a label on the device or from a user manual and provides the security KEY to the REMOTE (operation 510), for example, by inputting a public key into an application program (APP) operating on the REMOTE device. In this example, the public key has been pre-generated (operation 518) and distributed to the REMOTE through OOB communication (operation 520).

Figure 6A:
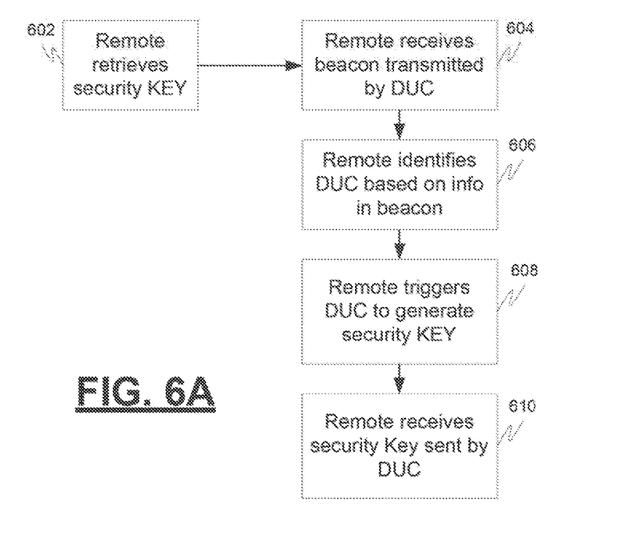
FIG. 6A is a process flow chart illustrating other example operations for the REMOTE to retrieve a security KEY, in accordance with some embodiments.

FIG. 6A is a process flow chart illustrating other example operations for the REMOTE to retrieve a security KEY. In this example, the public key is generated and distributed in real time during the DUC configuration process. The REMOTE retrieves the security KEY (operation 602) by receiving a beacon transmitted by the DUC (operation 604) after the DUC is powered on. The REMOTE identifies the DUC based on information contained in the beacon (operation 606). The REMOTE triggers the DUC identified by the beacon to generate a security KEY (operation 608). The REMOTE receives the security KEY, e.g., the public key, from a transmission from the DUC to the REMOTE (operation 610).

Figure 6B:
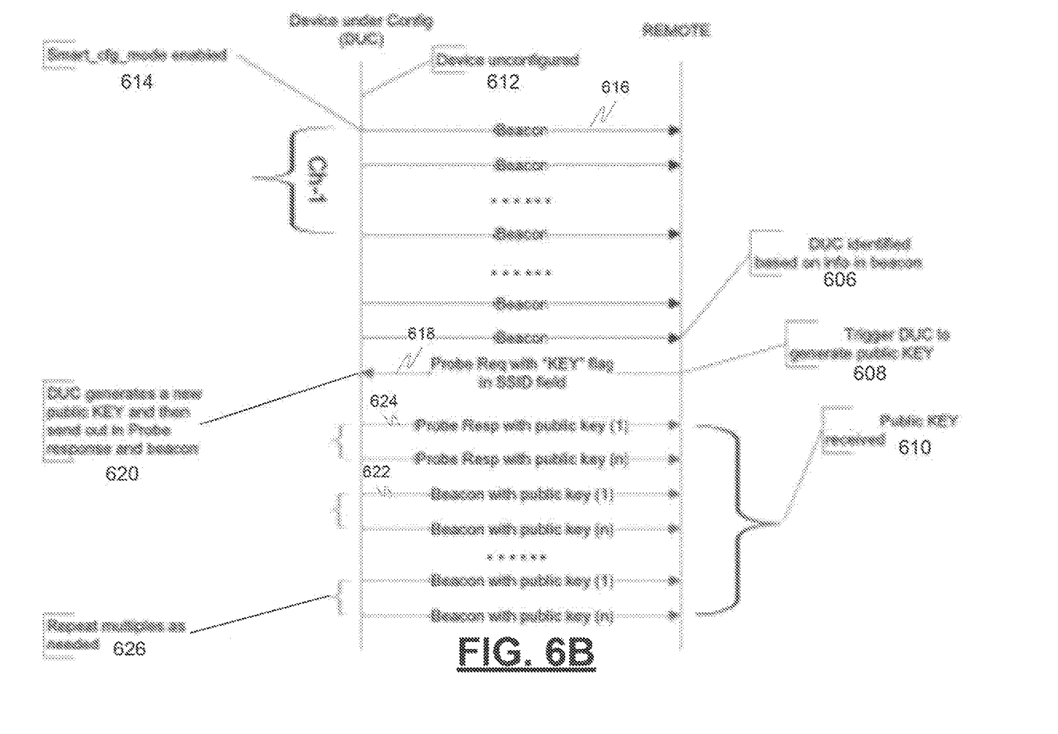
FIG. 6B is a state diagram illustrating other example communications between the DUC and REMOTE during operations for the REMOTE to retrieve a security KEY, in accordance with some embodiments.

FIG. 6B is a state diagram illustrating other example communications between the DUC and REMOTE during operations for the REMOTE to retrieve a security KEY. Initially, the DUC is in a non-configured (state 612). The DUC is powered on and a smart configuration mode is enabled (state 614). In this mode the DUC transmits one or more beacon(s) 616. The REMOTE receives a beacon and identifies the DUC based on information contained in the beacon (operation 606). The REMOTE triggers the DUC identified by the beacon to generate a security KEY (operation 608). In this example, the REMOTE triggers the DUC by sending a probe request frame 618 with a special flag called "KEY" in the SSID field to the DUC to trigger RSA key generation and distribution by the DUC. The DUC generates a new private and public key pair based on RSA algorithm when the triggering frame is received (operation 620). The DUC distributes the public key in a beacon 622 and/or probe response frames 624 in its SSID field when the key is available. Optionally, the public key could be embedded in multiple beacon/probe response frames (e.g., frame 1-frame n) depending on the length of the key. The transmission of beacon with public key included may be repeated a few times to ensure that it can be received by the REMOTE (operation 626). The REMOTE receives the security KEY, e.g., the public key, from a transmission from the DUC to the REMOTE (operation 610).

Figure 7A:
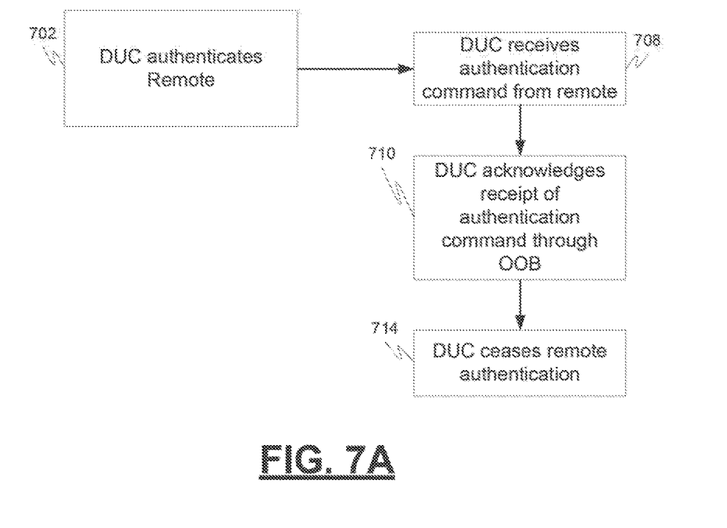
FIG. 7A is a process flow chart illustrating example operations for the DUC to authenticate the REMOTE, in accordance with some embodiments.
Figure 7B:
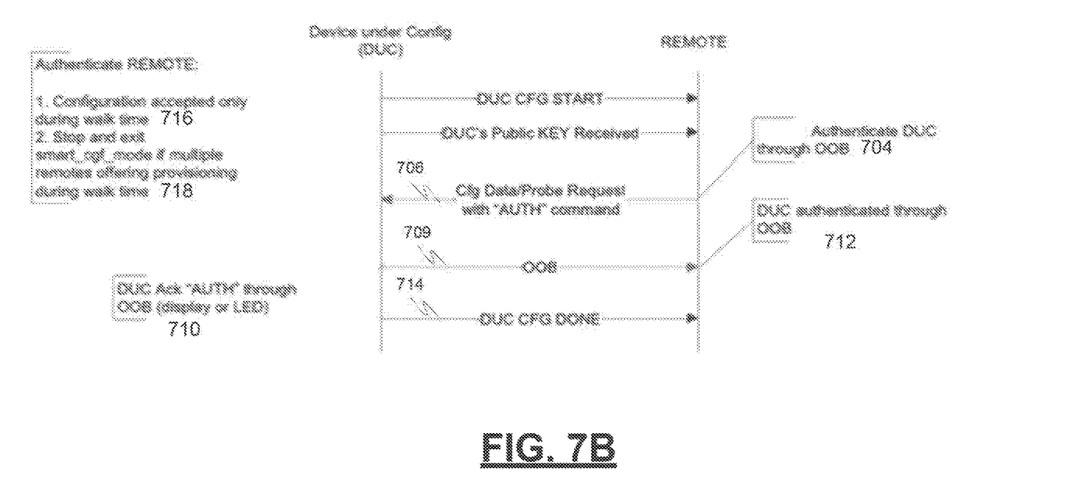
FIG. 7B is a state diagram illustratina example operations for the DUC to authenticate the REMOTE.

FIG. 7A is a process flow chart illustrating example operations for the DUC to authenticate the REMOTE (operation 702) and FIG. 7B is a state diagram illustrating example operations for the DUC to authenticate the REMOTE. After the public key becomes available, the REMOTE sends an authentication (AUTH) command (operation 704), for example, through configuration data or a probe request frame 706 to the DUC for authentication. If the AUTH command is received by the DUC (operation 708), the DUC then acknowledges receipt of the AUTH command to the REMOTE using OOB communication 709, e.g., on the DUC display (if available) or by blinking LED lights with a predefined pattern (operation 710). A user can visually observe the acknowledgement and enter an indication that the REMOTE has received the DUC authentication command acknowledgement. The REMOTE has then completed its authentication of the DUC (state 712) and the DUC has completed its authentication of the REMOTE (state 714).

For further security, the DUC may apply certain conditions for authenticating the REMOTE. The DUC may in some examples only authenticate the REMOTE if authentication is requested within a predetermined period of time (e.g., walk-time such as two minutes) (condition 716). Additionally, or in the alternative, in some examples, the DUC may cease authentication if multiple REMOTEs attempt authentication with the DUC. As a further security measure, the DUC may exit from the configuration mode if either condition occurs and require device resetting before continuing with configuration.

Figure 8:
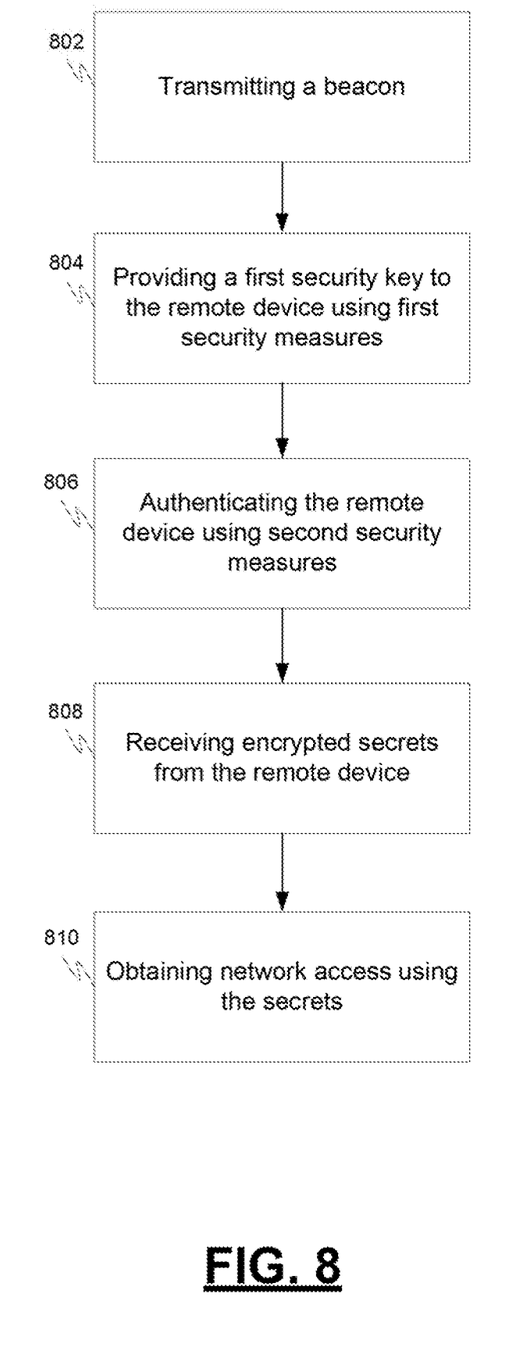
FIG. 8 is a process flow chart illustrating example operations in a DUC for communicating with a remote device over a wireless network, in accordance with some embodiments.

FIG. 8 is a process flow chart illustrating example operations in a DUC for communicating with a remote device over a wireless local area network. The operations include transmitting a beacon to a remote device (operation 802); providing a first security key to the remote device using first security measures (operation 804); authenticating the remote device using second security measures (operation 806); receiving encrypted secrets from the remote device (operation 808); and obtaining network access using the secrets (operation 810). The operations may be performed by a processor in the DUC executing program instructions stored in memory in the DUC that when executed cause the DUC to perform the foregoing operations.

Figure 9:
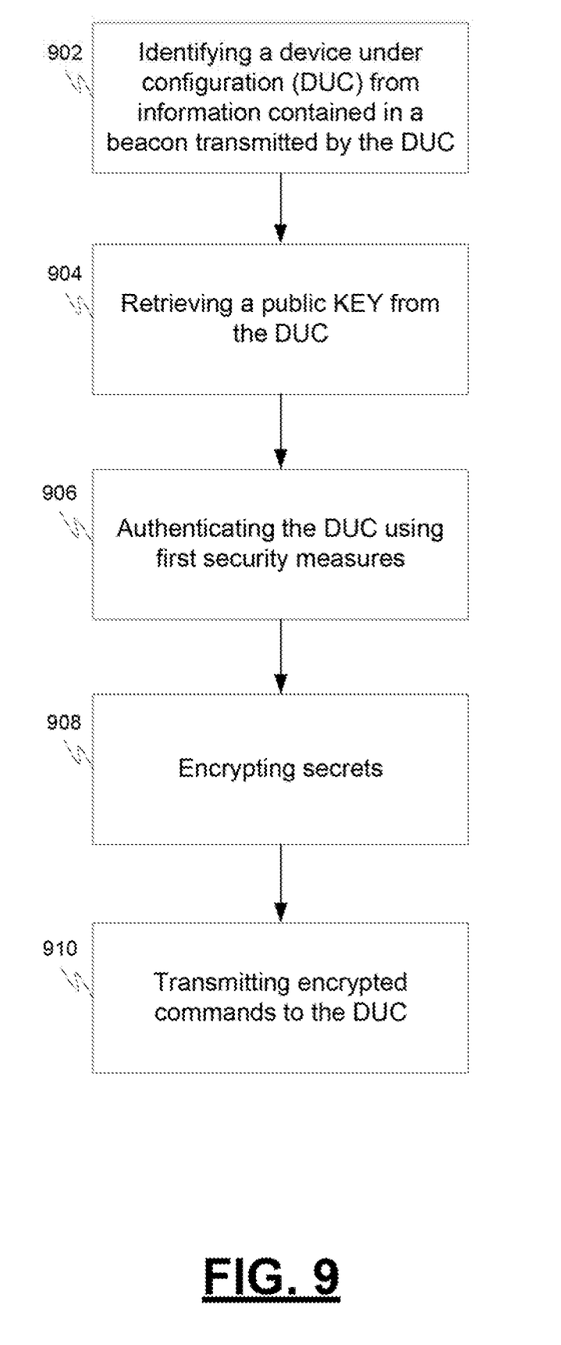
FIG. 9 is a process flow chart illustrating example operations in a REMOTE for providing network access credentials over a wireless network to a DUC, in accordance with some embodiments.

FIG. 9 is a process flow chart illustrating example operations in a REMOTE for providing network access credentials over a wireless network to a DUC. The operations include identifying a device under configuration (DUC) from information contained in a beacon transmitted by the DUC (operation 902), retrieving a public KEY from the DUC (operation 904), authenticating the DUC using first security measures (operation 906), encrypting secrets (operation 908), and transmitting encrypted commands to the DUC (operation 910). The operations may be performed by a processor in the REMOTE executing program instructions stored in memory in the REMOTE that when executed cause the REMOTE to perform the foregoing operations.

Figure 10:
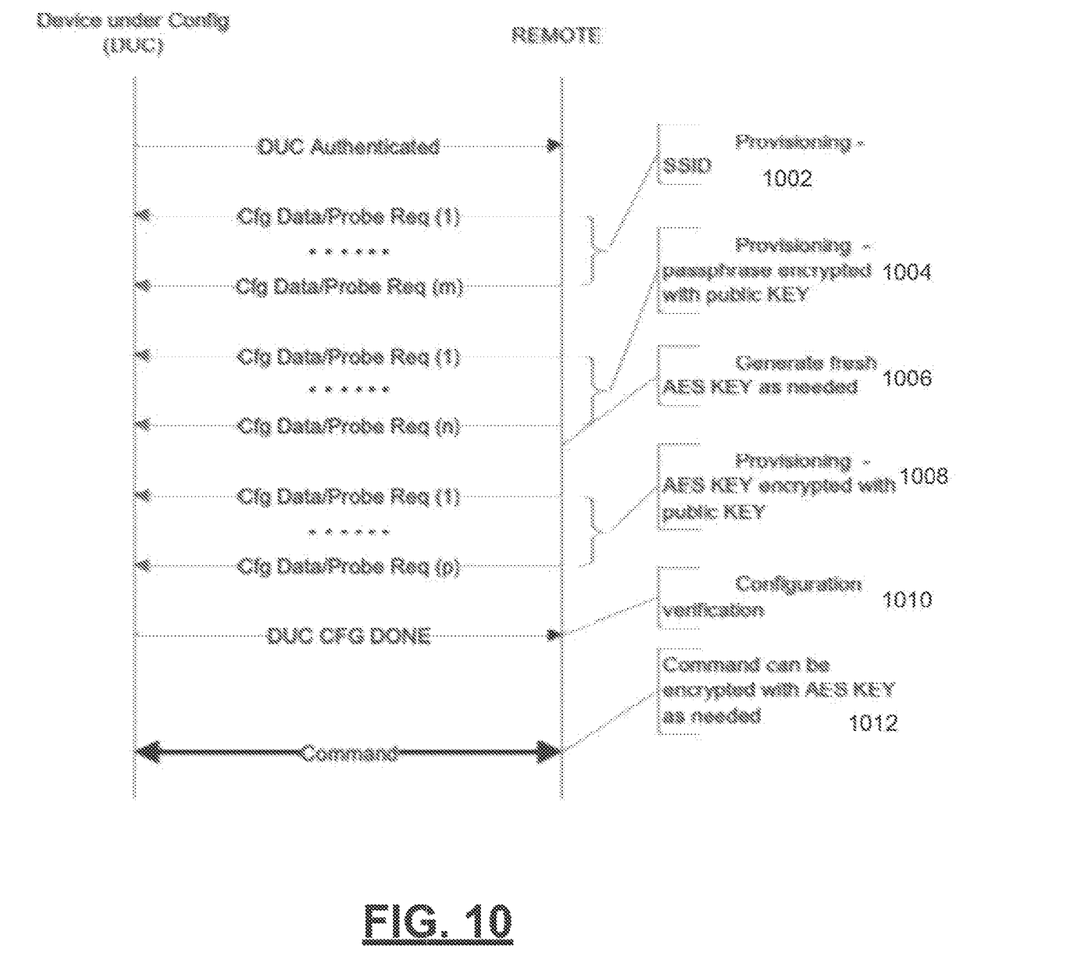
FIG. 10 is a state diagram illustrating example communications between the DUC and REMOTE during provisioning operations, in accordance with some embodiments.

FIG. 10 is a state diagram illustrating example communications between the DUC and REMOTE during provisioning operations. After the DUC has been authenticated, the REMOTE sends provisioning information to the DUC. The provisioning information is encrypted using the public key before it is sent from the REMOTE to the DUC. The SSID is optionally sent, e.g., when the SSID is hidden (operation 1002). The passphrase is encrypted and transmitted (operation 1004). The REMOTE generates an AES KEY (operation 1006). The REMOTE encrypts the AES KEY and transmits the encrypted KEY to the DUC (operation 1008). Any other KEY may be encrypted and transmitted by the REMOTE to the DUC. Upon completion of DUC configuration, the DUC transmits information to the REMOTE indicating that the DUC configuration is complete (operation 1010). Any subsequent exchange of commands or data between the DUC and REMOTE may be encrypted with the AES KEY (operation 1012).

The foregoing examples illustrate systems and methods for securely providing network credentials and other secrets from a REMOTE device to a IOT device to be configured. In one embodiment, disclosed is a method in a device under configuration (DUC) for communicating with a remote device over a wireless local area network. The method comprises providing a first security key to a remote device using first security measures, authenticating the remote device using second security measures, receiving encrypted secrets from the remote device, and obtaining network access using the secrets.

These aspects and other embodiments may include one or more of the following features. The providing a first security key to the remote device using first security measures may comprise providing the first security key using a first OOB communication. The first OOB communication may comprise preprinted information packaged with the DUC. The providing a first security key to the remote device using first security measures may comprise providing the first security key in response to a request by the remote device. The authenticating the remote device using second security measures may comprise receiving an authentication command from the remote device within a predetermined period of time and providing an acknowledgement of the authentication command using a second OOB communication. The method may further comprise refusing to authenticate the remote device if it is detected that more than one remote device has attempted authentication during the predetermined period of time. The secrets may comprise credentials for logging onto a network. The credentials may comprise an SSID for a network and/or a passphrase of for the network. The secrets may comprise a second security KEY for use in communicating with the remote device. Some of the secrets may have been encrypted using the second security key. The secrets may have been encrypted using the first security key. The method may further comprise receiving encrypted commands from the remote device that are encrypted using the second security KEY. The method may further comprise receiving encrypted commands from the remote device that are encrypted using the first security KEY.

In another embodiment, disclosed is a method of providing network access information over a wireless network. The method comprises identifying a device under configuration (DUC) from information contained in a beacon transmitted by the DUC, retrieving a public KEY from the DUC, authenticating the DUC using first security measures, encrypting secrets, and transmitting encrypted commands to the DUC.

These aspects and other embodiments may include one or more of the following features. The retrieving the public KEY may comprise transmitting a request to the DUC to generate and transmit the public KEY. The retrieving the public KEY may comprise retrieving the public KEY using a first OOB communication. The first OOB communication may comprise preprinted information packaged with the DUC. The authenticating the DUC using first security measures may comprise transmitting an authentication command to the DUC within a predetermined period of time and receiving an acknowledgement of the authentication command using a second OOB communication. The second OOB communication may comprise a message on a DUC display or LED lights blinking in a predefined pattern. The secrets may comprise credentials for logging onto a network. The credentials may comprise an SSID for a network and/or a passphrase for the network. The secrets may comprise a second security KEY for use in communicating with the DUC. The encrypting the secrets may comprise encrypting the secrets using the second security key. The encrypting the secrets may comprise encrypting the secrets using the first security key. The transmitting encrypted commands to the DUC may comprise encrypting the commands using the second security key. The transmitting encrypted commands to the DUC may comprise encrypting the commands using the first security key.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method in a device under configuration (DUC) for communicating with a remote device over a wireless local area network, the method comprising:
   providing a first security key to a remote device using a first out of band (OOB) communication of the wireless network, wherein the first OOB communication comprises light emitting diode signals emitted in a visible light spectrum and modulated in a binary pattern;
   authenticating the remote device using a probe request frame, wherein the probe request frame is transmitted over the wireless local area network in a radio spectrum;
   receiving encrypted secrets from the remote device; and
   obtaining network access using the encrypted secrets.

2. The method of claim 1 wherein the providing the first security key to the remote device using the first security measures comprises providing the first security key in response to a request by the remote device.

3. The method of claim 1 wherein authenticating the remote device using the probe request frame comprises:
   receiving an authentication command through the probe request frame sent from the remote device within a predetermined period of time; and
   providing an acknowledgement of the authentication command using a second out of band (OOB) communication.

4. The method of claim 3 further comprising:
   refusing to authenticate the remote device when it is detected that more than one remote device has attempted authentication during the predetermined period of time.

5. The method of claim 1 wherein receiving encrypted secrets comprises receiving credentials for logging onto a network.

6. The method of claim 5 wherein receiving the credentials for logging onto the network comprises receiving a service set identifier (SSID) for the network and/or a passphrase for the network.

7. The method of claim 1 wherein receiving the encrypted secrets comprises receiving a second security key for use in communicating with the remote device.

8. The method of claim 7 wherein receiving encrypted secrets comprises receiving secrets encrypted using the second key.

9. The method of claim 1 wherein receiving encrypted secrets comprises receiving secrets encrypted using the first security key.

10. A method of providing network access information over a wireless network, comprising:
    identifying a device under configuration (DUC) from information contained in a beacon that is received over a wireless network;
    in response to the received beacon, sending to the DUC, a request for a first security key of the device under configuration;
    retrieving a public key from the DUC using a first communication out of band (OOB) of the wireless network, wherein the first OOB communication comprises light emitting diode signals in a visible light spectrum modulated in a binary pattern;
    transmitting an authentication command to the DUC using a probe request frame wherein the probe request frame is transmitted over the wireless network in a radio spectrum;
    encrypting secrets using a second security key; and
    transmitting the encrypted secrets to the DUC, wherein the encrypted secrets are transmitted over the wireless network in the radio spectrum.

11. The method of claim 10, wherein retrieving the public key comprises transmitting a request to the DUC to generate and transmit the public key.

12. The method of claim 10 further comprising:
    receiving an acknowledgement of the authentication command using a second out of band (OOB) communication.

13. The method of claim 12 wherein the second OOB communication comprises a message on a display of the DUC or LED lights blinking in a predefined pattern.

14. The method of claim 10 wherein receiving the encrypted secrets comprises receiving credentials for logging onto a network.

15. The method of claim 14 wherein receiving the credentials comprises receiving a service set identifier (SSID) for the network and/or a passphrase for the network.

16. The method of claim 10 wherein the receiving encrypted secrets comprises receiving a second security key for use in communicating with the DUC.

17. The method of claim 10 wherein encrypting the secrets using the second security key comprises encrypting the first security key using the second security key.

18. A system for communicating with a remote device over a wireless local area network, the system comprising:
    control circuitry coupled to a receiver, the control circuitry configured to:
      providing a first security key to a remote device using a first out of band (OOB) communication of the wireless network, wherein the first OOB communication comprises light emitting diode signals emitted in a visible light spectrum and modulated in a binary pattern;
      authenticating the remote device using a probe request frame, wherein the probe request frame is transmitted over the wireless local area network in a radio spectrum; and
      obtaining network access using the encrypted secrets; and
    the receiver configured to:
      receive encrypted secrets from the remote device.

19. The system of claim 18, wherein the control circuitry is configured to provide the first security key to the remote device using the first security measures by providing the first security key in response to a request by the remote device.

20. The system of claim 18, wherein the control circuitry is configured to authenticate the remote device using the probe request frame by:
   receiving an authentication command through the probe request frame sent from the remote device within a predetermined period of time; and
   providing an acknowledgment of the authentication command using a second out of band (OOB) communication.

\* \* \* \* \*